United States Patent [19]

Mednikov

[11] Patent Number: 5,629,619
[45] Date of Patent: May 13, 1997

[54] NONCONTACT DISTANCE-MEASURING SYSTEM HAVING AT LEAST ONE COIL AND METHOD OF NONCONTACT DISTANCE MEASURING OPERATING EITHER ON THE BASIS OF EDDY CURRENTS OR BY INDUCTANCE

[75] Inventor: Felix Mednikov, Samara, Russian Federation

[73] Assignee: Micro-Epsilon Messtechnik GmbH & Co. KG, Ortenburg, Germany

[21] Appl. No.: 331,478

[22] PCT Filed: Aug. 6, 1993

[86] PCT No.: PCT/DE93/00703

§ 371 Date: Oct. 31, 1994

§ 102(e) Date: Oct. 31, 1994

[87] PCT Pub. No.: WO94/03778

PCT Pub. Date: Feb. 17, 1994

[30] Foreign Application Priority Data

Aug. 6, 1992 [DE] Germany ............... 42 25 968.1

[51] Int. Cl.[6] ............... G01B 7/14; G01D 5/20
[52] U.S. Cl. ............... 324/207.16; 324/207.12; 324/207.24; 340/870.31
[58] Field of Search ........... 324/207.12, 207.15–207.19, 324/207.22, 207.24; 340/870.31–870.33; 137/554

[56] References Cited

U.S. PATENT DOCUMENTS

| | | | |
|---|---|---|---|
| 3,846,771 | 11/1974 | Young et al. | 324/207.19 X |
| 4,140,998 | 2/1979 | Bettle. | |
| 4,502,006 | 2/1985 | Goodwin et al. | 324/207.16 |
| 4,577,509 | 3/1986 | Moser | 324/207.19 X |

FOREIGN PATENT DOCUMENTS

| | | | |
|---|---|---|---|
| 1147874 | 4/1963 | Germany. | |
| 0027922 | 2/1980 | Japan | 324/207.16 |
| 0994906 | 2/1983 | U.S.S.R. | 324/207.16 |
| 1559091 | 1/1980 | United Kingdom | 324/207.16 |
| 2053487 | 2/1981 | United Kingdom. | |

*Primary Examiner*—Gerard R. Strecker
*Attorney, Agent, or Firm*—Bell, Seltzer, Park & Gibson, P.A.

[57] ABSTRACT

A noncontact distance measuring system with a sensor (2) that draws on alternating current and has a measuring coil (1), an electronic supply/evaluation circuit (3) connected with the sensor (2), and an electrically and/or magnetically conductive test object (4) associated to the sensor (2), the measuring coil being packaged in a preferably cylindrical housing, and the test object (4) at least partially surrounding the coil housing (5) and being movable in its longitudinal direction, is structured so as to reduce the overall length and to avoid the output impedance of the measuring coil from the position of the test object, in that the test object (4) is designed as a ring (6) surrounding the coil housing (5) at a distance, that the measuring coil (1) has at least two voltage taps (7), so that depending on the number of voltage taps (7) either voltage values can be tapped sequentially between the individual voltage taps (7) and a reference potential (8), and that the electronic supply/evaluation circuit (3) includes an electronic component (10) for adding up the tapped voltage values to a total voltage correlating with the position of the test object (4), or individual voltages between the voltage taps (7) can be tapped sequentially, and that the electronic supply/evaluation circuit (3) includes an electronic component (9) for adding up the tapped individual voltages to increasing voltage values and a further electronic component (10) for once again adding up the voltage values to a total voltage correlating with the position of the test object.

18 Claims, 5 Drawing Sheets

NONCONTACT DISTANCE-MEASURING SYSTEM HAVING AT LEAST ONE COIL AND METHOD OF NONCONTACT DISTANCE MEASURING OPERATING EITHER ON THE BASIS OF EDDY CURRENTS OR BY INDUCTANCE

BACKGROUND OF THE INVENTION

This invention relates to a noncontact distance measuring system comprising a sensor that can be biased by alternating current and is provided with a measuring coil, an electronic supply/evaluation circuit, and an electrically and/or magnetically conductive test object, the measuring coil being packaged in a preferably cylindrical coil housing, and the test object surrounding the coil housing at least in part and being movable in its longitudinal direction. The present invention also relates to a method of noncontact distance measuring by means of a corresponding distance measuring system.

Noncontact distance measuring systems of different types and designs have been known in practice for years. By their basic method of operation, they may be classified on the one hand as distance measuring systems operating on the basis of eddy currents, inductive and capacitive distance measuring systems, and on the other hand as optical or acoustical distance measuring systems.

The present invention relates to a noncontact distance measuring system with a sensor having at least one coil, i.e., to distance measuring systems which operate either on the basis of eddy currents or by inductance.

Known already per se from DE-A 38 01 828 is a displacement sensor, in which a permanent magnet is arranged on a living body, and the change in the flux of the permanent magnet is measured as a measurement for the movement or vibration of the living body. In this prior document, the displacement sensor comprises a housing and a nonmagnetically conductive screening capsule inserted into the housing. Also the screening capsule is a dielectric, thermoplastic plastic. Furthermore, several induction coils are provided inside the housing. The screening capsule serves primarily not to disturb or influence a processing circuit by electromagnetic or electric fields of the displacement sensor.

Further known per se from DE-B-1 900 894 is a method of making an inductive transducer for measuring a distance. This cited publication also discloses sensors, which are surrounded on the one hand by a metal sleeve, and protected on the other hand by an epoxy resin applied to their measuring side.

Further known already from practice are so-called eddy-current long-distance measuring sensors, which are used, for example, in hydraulic or pneumatic cylinders for measuring the displacement and position of pistons or valves. Furthermore, long-distance measuring sensors of the kind in question permit a displacement measuring on presses, punches, roll stands, etc. In hydraulic and pneumatic cylinders, the sensors are packaged in pressure-resistant manner, and the housings are made of stainless steel. The eddy-current measuring principle applied therein is noncontacting. Thus, the sensors are not subjected to mechanical wear. Used as test object is an aluminum pipe which is moved concentrically and free of contact over a bar. Arranged in the interior of the bar is a coil which is protected against environmental influences. By the inductance of eddy currents in the aluminum pipe, energy is withdrawn from the coil and it is thus detuned.

An integrated, miniaturized electronic circuit converts the pipe position into a linear electronic output signal ranging normally from 4 to 20 mA. To supply the sensor, a dc voltage between 15 and 30 volts is provided. The long-distance measuring sensors known from practice are however problematic, inasmuch as the aluminum pipe serving as test object is pushed as a whole over the bar which accommodates the coil. Thus, if the entire length of the coil is to be used as length of measurement, it will be necessary to push the aluminum pipe almost entirely over the bar, so that from the length of the bar and of the aluminum tube, an approximately resultant overall length of the long-distance measuring sensor or the distance measuring system at issue is obtained.

Moreover, there exist problems to the extent that in the case of the long-distance measuring sensors in question, the output impedance of the measuring coil is always dependent on the position of the test object or of the aluminum pipe serving as test object. Consequently, it is necessary in this instance to compensate by providing a corresponding electronic system, which results in enormous costs with regard to design and construction.

It is therefore the object of this invention to describe a noncontact distance measuring system, which comprises a measuring coil having a small overall length and being of a simple construction, the output impedance of which is independent of the position of the test object. Furthermore, it is the object to describe a corresponding method of noncontact distance measuring.

SUMMARY OF THE INVENTION

The above and other objects and advantages of the present invention are achieved by the provision of a noncontact distancing measuring system comprising a sensor that can be biased by alternating current and is provided with a measuring coil, an electronic supply/evaluation circuit, and an electrically and/or magnetically conductive test object associated to the sensor. Accordingly, the distance measuring system of the present invention is designed and constructed such that the test object consists of a ring surrounding the coil housing at a distance therefrom. Furthermore, the measuring coil is provided with at least two voltage taps, so that in accordance with the number of voltage taps, voltage values can be tapped sequentially, each between the individual voltage taps and a reference potential, and that the electronic supply/evaluation circuit comprises an electronic component for processing a summation of the tapped voltages to produce a total voltage which is correlated with the position of the test object.

As an alternative to the foregoing embodiment, the distance measuring system of the present invention may also be designed and constructed such that in accordance with the number of voltage taps individual voltages can be tapped sequentially between the voltage taps, and that the electronic supply/evaluation circuit comprises an electronic component for amplifying the summation of the tapped individual voltages to produce an increased voltage value, as well as a further electronic component for processing the increased voltage value to produce a total voltage correlated with the position of the test object.

To begin with, it has been recognized in accordance with the invention, that the overall length of the noncontact distance measuring system can be reduced considerably, in particular with respect to a full utilization of the measuring length, in that the test object is constructed as a ring surrounding the coil housing at a distance therefrom. As a result, the test object has only a small overall length, and is thus not pushed beyond the coil housing accommodating the measuring coil. Furthermore, it is possible to clearly determine, in accordance with the invention, the location of the ring serving as test object, in that the coil is provided with at least two, preferably more voltage taps, so that in accordance with the number of voltage taps it is possible to tap voltage values, one after the other, each between the individual voltage taps and a reference potential. The electronic supply/evaluation circuit includes in addition an electronic component for processing a summation of the tapped voltages to produce a total voltage which is correlated with the position of the test object. As an alternative, it would be possible to sequentially tap individual voltages between the voltage taps. In this instance, the electronic supply/ evaluation circuit would have to include an electronic component for adding the tapped individual voltages to increasing voltage values. Furthermore, the electronic component would process the voltage values already added up from individual voltages to a total voltage correlated with the position of the test object.

In accordance with the above-explained alternative configurations, the distance measuring system of this invention is laid out such that the impedance of the measuring coil in the measuring range is not dependent on the position of the test object. Consequently, the current flowing through the measuring coil remains unchanged for each position of the ring serving as test object. The signal at the output of the component for adding the voltage values is accordingly linearly dependent on the position or coordinate of the ring movable over the coil housing.

With respect to the addition of the individual voltages that can be tapped between the voltage taps, it will be of advantage, when the individual voltage taps are followed by a differential amplifier for the tapped individual voltages. The output of this differential amplifier could be connected to the additional electronic component for processing the summation of the voltage values to a total voltage correlated with the position of the test object, or it could supply this electronic component.

In a particularly advantageous manner, the electronic component for amplifying the voltage values could be designed as a summation amplifier. This summation amplifier could again be provided with an inverting input.

With respect to a reliable detection of the ring serving as the object, it will also be advantageous, when voltage taps or the coil sections extending between the voltage taps are selected so that individual voltages are at least largely identical in the absence of the ring. Consequently, it is possible to determine the position of the ring in that a different voltage can be tapped precisely between those voltage taps, between which the ring is arranged.

In accordance with its position and based on the addition to a total voltage, this voltage enters into the total voltage which is formed by addition, so that a variation from the total voltage occurs in accordance with the number of the measured voltage values which have been influenced by the test object.

In a further advantageous manner, resistors are arranged between the individual voltage taps and a common measuring tap, which are coupled to one another on the side facing away from the respective voltage tap in direction toward the measuring tap. Consequently, a linkage of the individual voltages occurs already at this point as a result of the selected voltage tap.

As regards an error-free detection of the position of the ring, it will further be advantageous, when the resistors have at least largely an identical rated value. This rated or resistance value is approximately two orders higher than the output resistance of the coil. Both the resistors and the measuring coil provided with voltage taps are arranged within the coil housing, thus resulting again in an only small size of the distance measuring system or sensor.

With respect to determining clearly the position of the ring serving as test object, same could have a width corresponding maximally to the spacing between two neighboring voltage taps, so that the ring can always be localized clearly between two voltage taps.

With respect to detecting a change in voltage between two voltage taps, it is possible to connect the measuring coil, preferably via two resistors, to a bridge circuit, so that in the event of a change in a tapped voltage value a balance of the bridge will no longer occur.

To lessen a temperature error, various measures may be taken. Thus, it would be possible to symmetrically supply the measuring coil by a source of ac voltage, with an additional supply occurring from a source of dc voltage followed by a separation of the dc and ac voltage components of the output voltage after their addition. After the demodulation of the ac voltage component, which is proportional to the change in position of the ring, the dc voltage component is subtracted with a corresponding transfer coefficient, the latter being selected for calibration. For purposes of compensating for a temperature error, the ring could also be provided with a compensation coil arranged in its interior for biasing with a dc voltage. The bias of the this compensation coil will be changed in accordance with an occurring temperature gradient.

With respect to the basic method of operation of the distance measuring system in accordance with the invention, same could operate basically by inductance or by the eddy-current principle. In a particularly advantageous manner, the measuring coil could be provided with a ferromagnetic core. The ring serving as test object could be made of a material having a low electrical resistivity, for example of aluminum.

The object underlying the present invention is accomplished with respect to the method of this invention selectively by the features as described below. Thus, in accordance with the number of voltage taps, voltage values are tapped one after the other, each between the individual voltage taps and a reference potential, and the tapped voltage values are added to a total voltage correlating to the position of the test object. As an alternative thereto, it would be possible to tap, in accordance with the number of voltage taps, individual voltages one after the other between the voltage taps, so that the tapped individual voltages are added to increasing voltage values, and processed to a total voltage correlated with the position of the test object.

It is essential that the position of the ring serving as test object is clearly determinable, in that the individual voltage changes between two voltage taps, when the ring is located between the voltage taps. Based on the addition to be made of all individual voltages in an increasing sequence to voltage values, which are again added up from one side of the measuring coil, it is possible to ascertain the position of the ring in accordance with the number of the measured voltage values which have been influenced by the test object as reflected in the sum total of the individual voltage values.

There exist various possibilities of perfecting and further developing the teaching of the present invention in advantageous manner. To this end, one may refer to the following description of an embodiment of the invention with reference to the drawing. The following description should not be construed so as to narrow the breadth of the claims of the invention. In conjunction with the description of the preferred embodiment of the invention with reference to the drawing, also generally preferred embodiments and further developments of the teaching are explained.

DETAILED DESCRIPTION OF THE PREFERRED EMBODIMENTS

Figure 1:
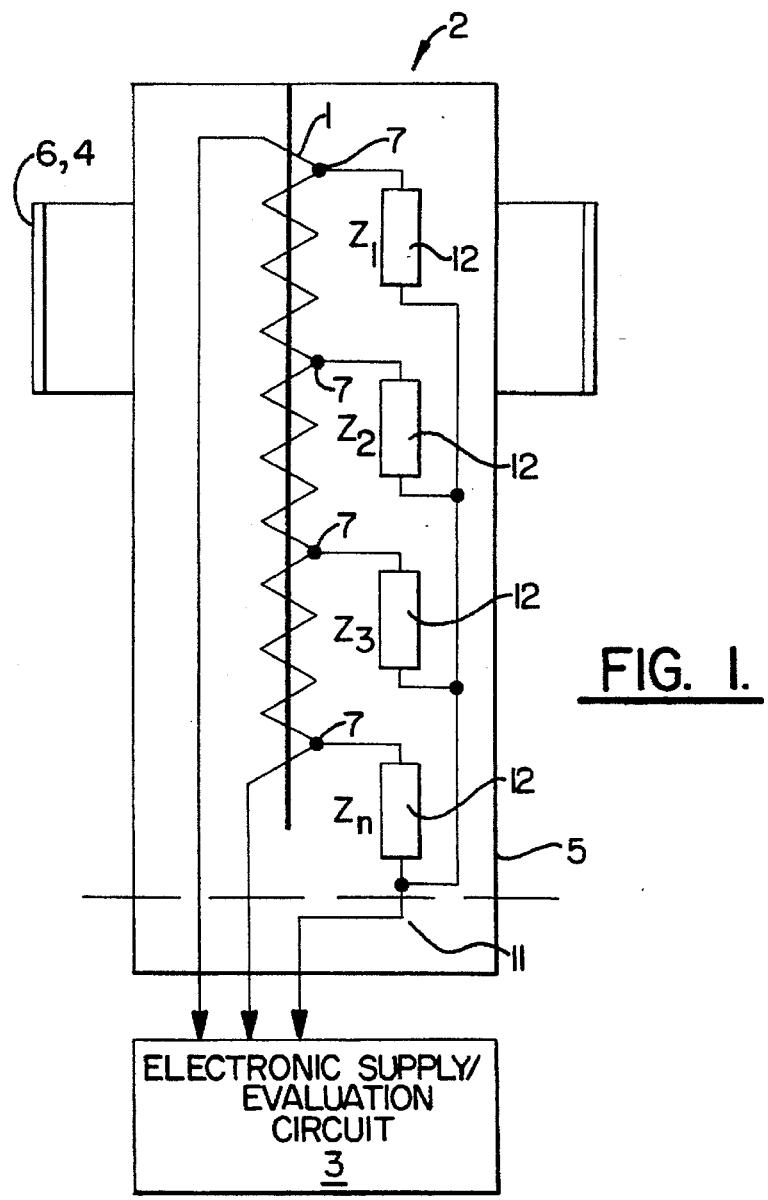
FIG. 1 is a partial schematic view of an embodiment of a distance measuring system in accordance with the invention.

Shown in FIG. 1 is an embodiment of a noncontact distance measuring system in accordance with the invention with a sensor 2 that can be biased by alternating current and comprises a measuring coil 1, an electronic supply/evaluation circuit 3, and an electrically and/or magnetically conductive test object 4 associated to sensor 2, the measuring coil 1 being packaged in a cylindrical coil housing 5, and the test object 4 surrounding the coil housing 5 and being movable in its longitudinal direction.

In accordance with the invention, the test object 4 is constructed as a ring 6 surrounding the coil housing 5 at a distance therefrom. In the here selected embodiment, the measuring coil 1 is provided with several voltage taps 7, so that in accordance with the number of voltage taps 7, voltage values can be tapped one after the other, each between the individual voltage taps 7 and a reference potential. The electronic supply/evaluation circuit 3 comprises an electronic component for processing the summation of the tapped voltage values to a total voltage correlated with the position of the test object 4.

Figure 2:
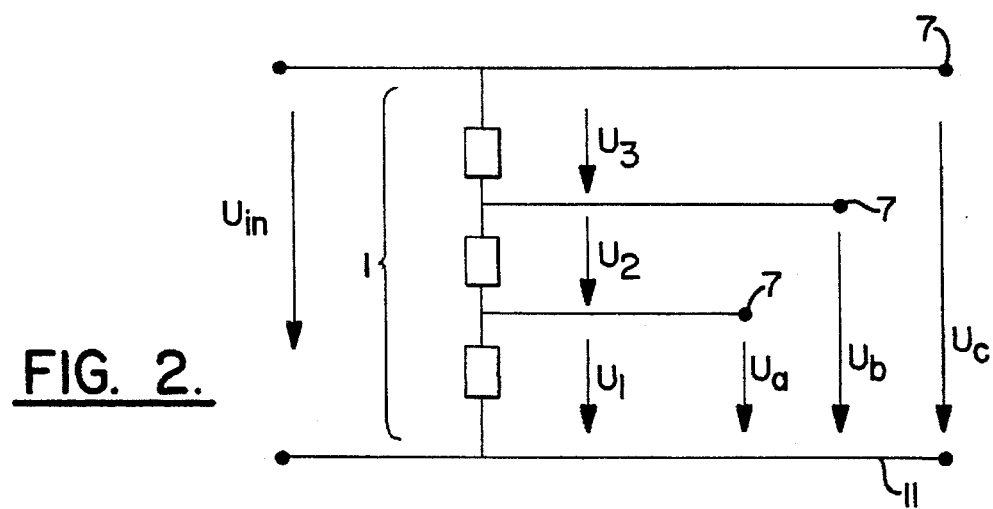
FIG. 2 is a schematic view of the voltage taps for tapping the voltage values between individual voltage taps and a reference potential.

FIG. 2 illustrates by way of a block diagram on the one hand the tapping of individual voltages U1, U2, U3, between voltage taps 7, as well as the summation of the individual voltages U1-U3 to increasing voltage values Ua, Ub, Uc. The unnumbered boxes in FIG. 2 represent the resistance/impedance of the coil 1 between the taps 7. Thus the voltage values may be summed, and the summation may be processed by an electronic component to a total voltage, which then assumes a corresponding value, based on the number of the measured voltage values that have experienced a voltage change caused by ring 6 between two voltage taps 7 in the sum total or total voltage. As a result, it is possible to clearly determine the position of ring 6.

Figure 3:
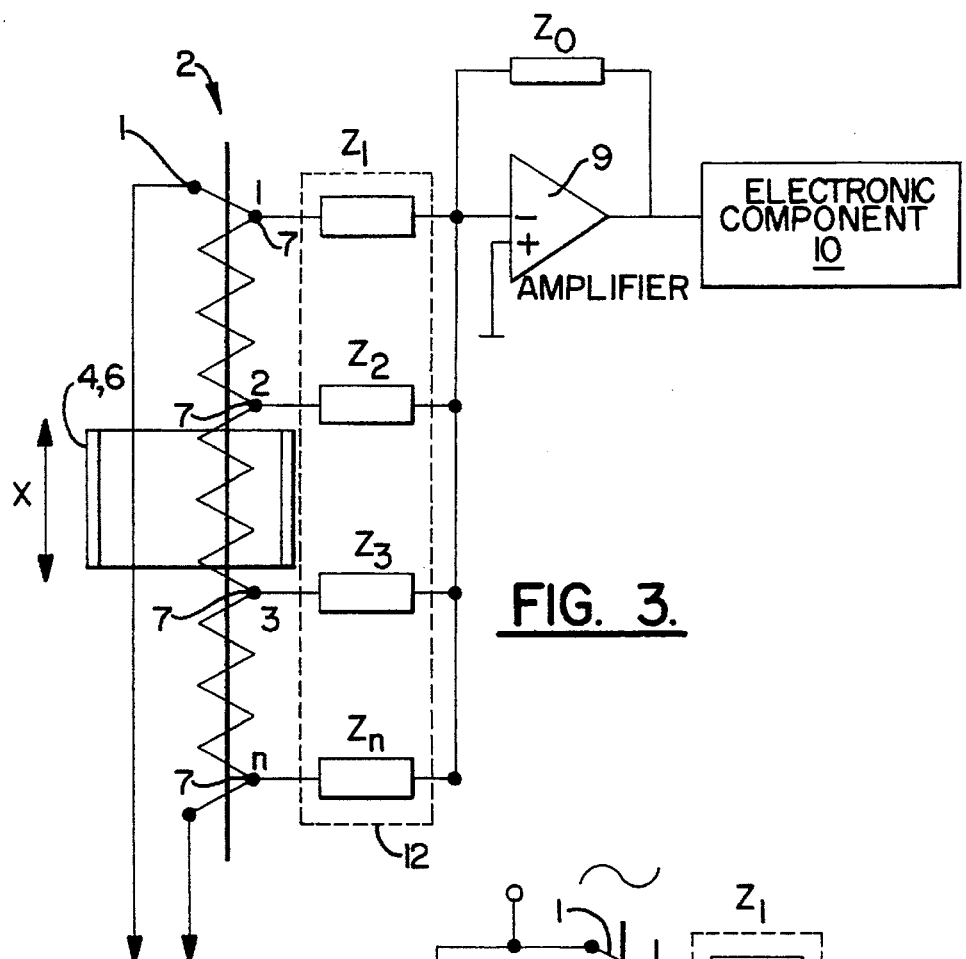
FIG. 3 shows the distance measuring system of FIG. 1 with an amplifier summing up the individual voltages.

Particularly clearly shown in FIG. 3 is that the voltage taps 7 are followed by a differential amplifier 9 for the tapped individual voltages. The output of differential amplifier 9 is connected to a further electronic component 10 for processing the voltage values to a total voltage correlated with the position of the test object 4, or ring 6. The electronic component 10 may be designed as a summation amplifier, preferably with an inverting input.

Further shown in FIG. 1 is that between the individual voltage taps 7 and a common measuring tap 11 resistors 12 are interposed, which are coupled to one another on the side facing away from each voltage tap in direction toward the measuring tap 11. These resistors 12 have an at least largely identical rating which is by about two orders higher than the output resistance of measuring coil 1 as a whole.

Further indicated in FIG. 1 is that the resistors 12 are arranged together with measuring coil 1 and voltage taps 7 within coil housing 5. Furthermore, as can be noted from the Figures, the ring 6 has a width which corresponds at most to the spacing between two adjacent voltage taps 7. This permits an accurate determination of the position of ring 6 between voltage taps 7.

Figure 4:
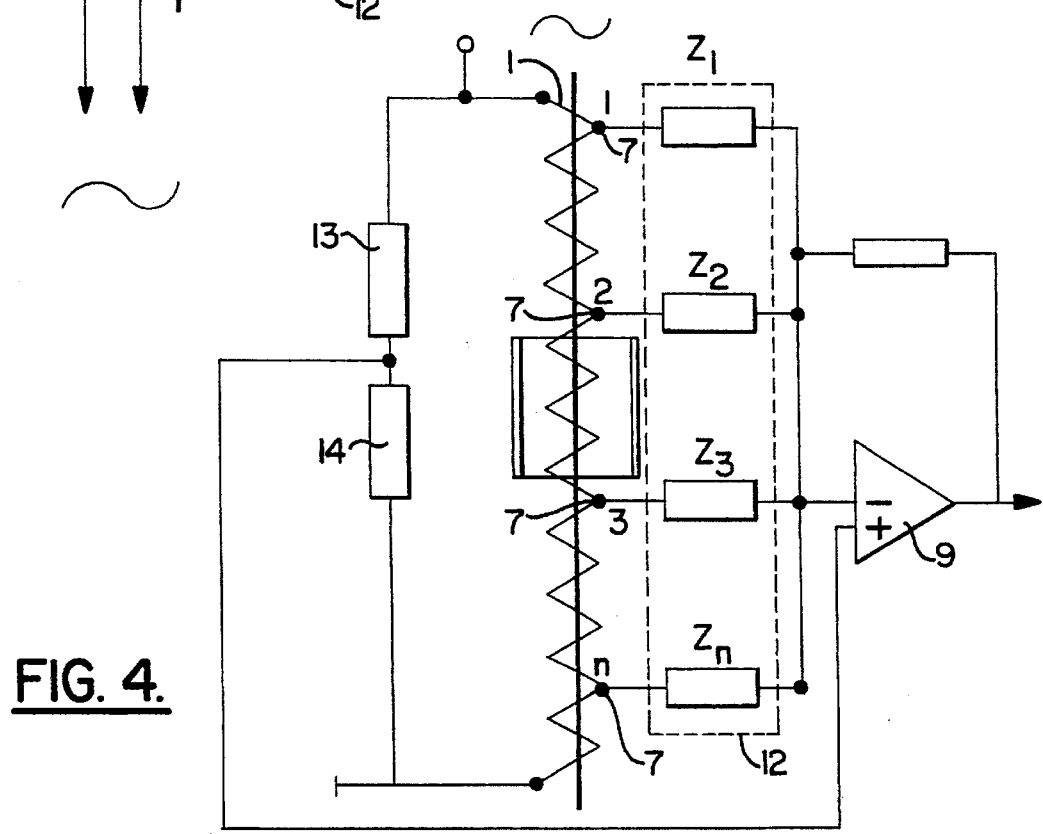
FIG. 4 illustrates the distance measuring system of FIG. 1 with a connection to a bridge circuit.
Figure 5:
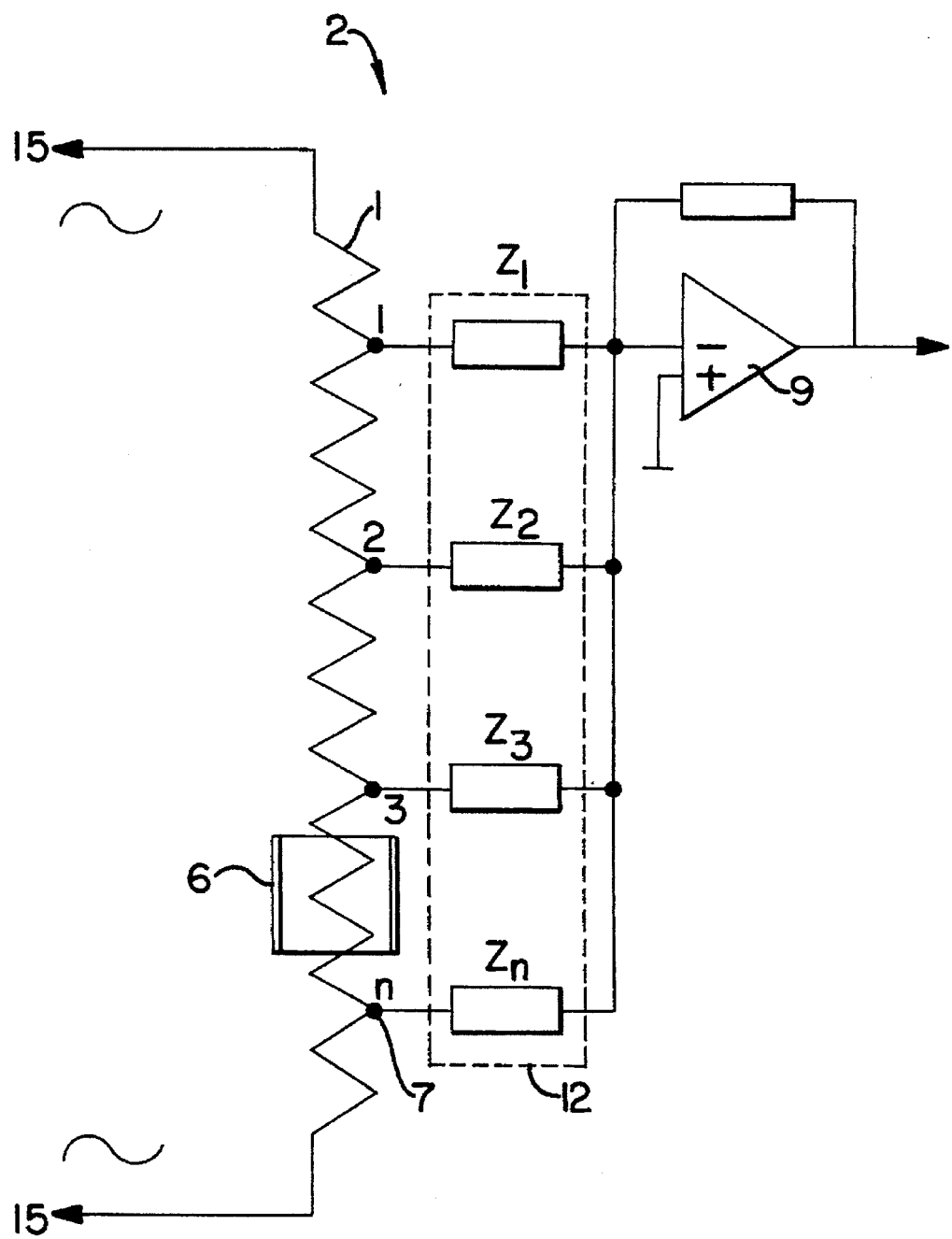
FIG. 5 illustrates the distance measuring system of FIG. 1 with a symmetrical bias by a source of ac voltage.

In accordance with the illustration of FIG. 4, the distance measuring system of this invention is connected, via two resistors 13, 14, to a bridge circuit. As illustrated in FIG. 5, the measuring coil 1 is symmetrically supplied by a source of ac voltage 15. According to the illustration of FIG. 6, a source of dc voltage 16 is additionally provided for a superposed biasing of measuring coil 1.

In the following reference is made on the one hand to the operating method, and on the other hand to the special details of the distance measuring system in accordance with the invention.

For the ac voltage at the output of differential amplifier 9 or the summation amplifier, the following general equation will apply in the absence of ring 6 serving as test object 4:

$$\dot{U}_\Sigma = \frac{\dot{U}_\sim \cdot K \cdot \left[ \sum_{i=1}^{n} \dot{i}\dot{Z}_i + n \cdot \dot{Z}_0 \right]}{\sum_{i=1}^{n} \dot{i}\dot{Z}_i + 2\dot{Z}_0},$$

where $U_\sim$ is the supply voltage and K the amplifier coefficient of summation amplifier 10, and where $$Z_1 = Z_2 = \ldots Z_n = Z; K = \frac{Z_0}{Z}$$

for $Z0$=the total resistance of the initial sections of the measuring coil, and $Z1 \ldots Zn$=the total resistances of the ranges of the measuring coil between the measuring taps ($Z1=Z2=\ldots Zn$). Z represents the total resistance of the measuring coil.

From the foregoing equation, it follows that a superimposition of ring 6 on individual coil sections results in a change of resistance values $Z1, Z2, \ldots Zn$, so that the output voltage or added total voltage is proportional to the position or coordinate of ring 6.

Consequently, the linearity of the output values or total voltage is always ensured with respect to the position of ring 6, inasmuch as the total resistance of measuring coil 1 remains identical in any desired positions of ring 6, with the same amount of current flowing through measuring coil 1. The width of ring 6 may be selected, for example, to be about 10% less than the spacing between two voltage taps 7, so that when the ring 6 is displaced, the total resistance Z of measuring coil 1 remains unchanged with regard to the currents flowing through resistors $Z1 \ldots$ to $Zn$.

In accordance with the illustration of FIG. 4, the measuring coil 1 is connected to a bridge circuit by means of additional resistors 13, 14. If the resistors 13, 14 have the same rated value, and ring 6 is arranged in the center of measuring coil 1, the voltage occurring at the output of the bridge will be adjusted to zero. A displacement of ring 6 in one of the two directions will then lead to a disturbance of the bridge balance, so that an output signal or an output voltage is present, which causes the signal phase to change.

FIG. 5 is a schematic view of biasing the measuring coil via the source of ac voltage 15. In this instance, the voltage applied to the output of the distance measuring system is likewise zero, when ring 6 is positioned in the center of measuring coil 1.

Figure 6:
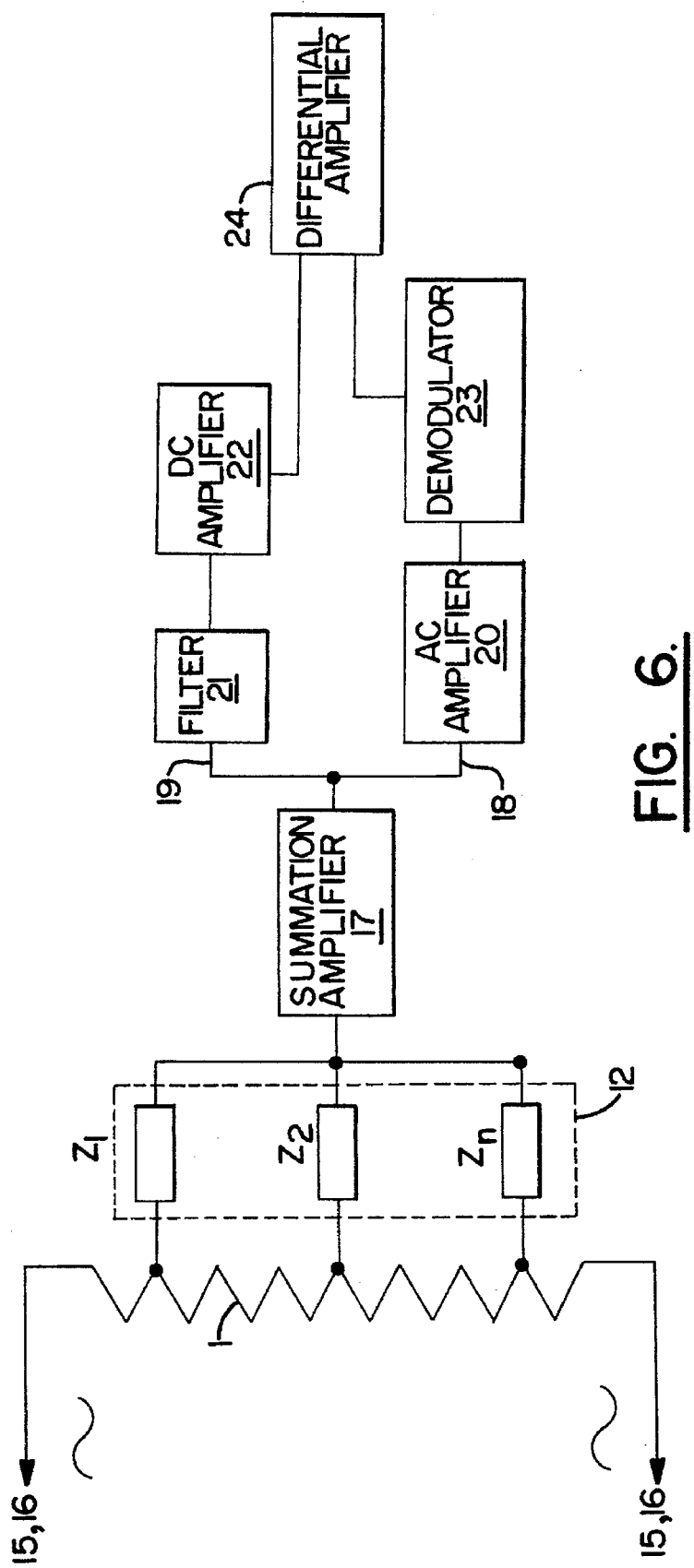
FIG. 6 illustrates the distance measuring system of the present invention with a temperature compensation.

In accordance with the illustration of FIG. 6, a temperature compensation is provided along measuring coil 1 for the occurrence of a temperature gradient. To this end, the measuring coil 1 is biased simultaneously by the source of ac voltage 15 and a source of dc voltage 16. A summation amplifier 17 adds in this process the ac and dc voltage components, which can be picked up by the taps of measuring coil 1. The thus-generated output signal of amplifier 17 is distributed to two channels 18, 19. In ac channel 18, the ac component of the signal is amplified by means of a further amplifier 20. In dc channel 19, the output signal of amplifier 17 is amplified by means of a low-frequency filter 21 and a dc amplifier The output signal of amplifier 20 is demodulated and filtered by means of a demodulator and finally supplied to the inverting input of a differential amplifier 24. The non-inverting input of differential amplifier 24 receives accordingly the signal of dc amplifier 22.

In the absence of a temperature gradient, the signal present at the output of dc amplifier 22 equals zero, and a dependency on the position of ring 6 is absent. In this instance, the output value of measuring coil 1 remains unchanged.

When a temperature gradient occurs along measuring coil 1, a voltage will develop at the output of dc amplifier 22, which is proportional to the temperature gradient. This voltage is subtracted from the output signal of demodulator 23 by means of differential amplifier 24, whereby the influence of the temperature gradient is compensated. The necessary coefficient for the temperature compensation in the dc channel is predetermined by the selection of the amplification coefficient of dc amplifier 22 with a preceding calibration of the distance measuring system.

The coil housing 5 should have a highest possible resistivity with a high conductivity of the temperature. The thickness of the housing wall should be substantially smaller than the penetration depth of the eddy currents.

The ring 6 serving as the test object should consist of a material with a low resistivity, so as to achieve a highest possible sensitiveness. The resistors 12 arranged directly in coil housing 5 should be highly stabilized and range from 10 to 20 kΩ. When the distance measuring system is connected to the above-described bridge circuit, the resistors 13, 14 should have a rating of about 1 kΩ.

Figure 7:
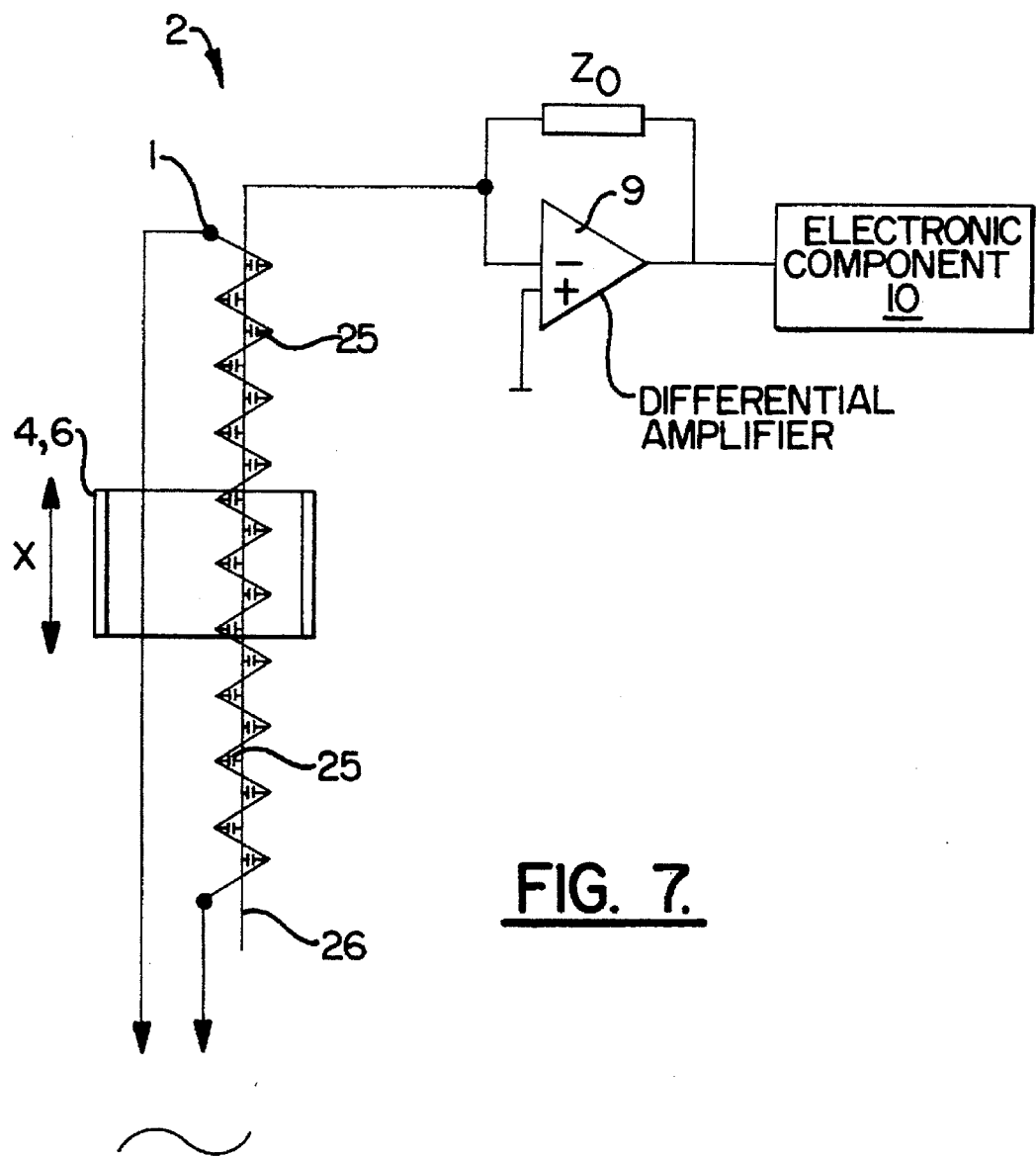
FIG. 7 is a partial schematic view of an alternative embodiment of a distance measuring system of this invention, in which coil taps are absent.

Illustrated in FIG. 7 is a simplified embodiment of a sensor without direct taps of the measuring coil 1. Unlike the above-described embodiments of distance measuring systems in accordance with the invention, in this embodiment the resistors are replaced with a so-called capacitor coating 25 of measuring coil 1 against coil core 26. Therefore, coil taps are no longer needed in this embodiment. The coil core 26 consists of an electrically conductive material, and is connected to the negative input of differential amplifier 9. The arrangement thus realized has the great advantage that the length of test object 4 or ring 6 may be dimensioned quasi infinitely small, inasmuch as the measuring coil 1, which is directly wound on core 26 or about a surrounding tube not shown in the Figure, has with its winding sections as many capacitances as are desired with respect to coil core 26, whose potential is connected to differential amplifier 9. As a result, the variant of a distance measuring system in accordance with the invention and as shown in FIG. 7 is used for a very exact measurement with smallest test objects 4, or rings 6, or even disks.

I claim:

1. Noncontact distance measuring system comprising a sensor (2) which includes a measuring coil (1), an electronic supply/evaluation circuit (3), connected to the measuring coil and including means for supplying an alternating current to the coil, and an electrically and/or magnetically conductive test object (4) associated to the sensor (2), the measuring coil (1) being packaged in a coil housing (5), and the test object (4) surrounding the coil housing (5) at least in part and being movable in its longitudinal direction, characterized in that the test object (4) is constructed as a ring (6) surrounding the coil housing (5) at a distance therefrom, that the measuring coil (1) is provided with at least two voltage taps (7), so that voltage values of the voltage taps can be tapped one after the other, each between the individual voltage tap (7) and a reference potential, and that the electronic supply/evaluation circuit (3) comprises an electronic component (10) for processing a summation of the tapped voltages to produce a total voltage which is correlated with the position of the test object (4).

2. Noncontact distance measuring system comprising a sensor (2) which includes a measuring coil (1), an electronic supply/evaluation circuit (3) connected to the measuring coil and including means for supplying an alternating current to the coil, and an electrically and/or magnetically conductive test object (4) associated to the sensor (2), the measuring coil (1) being packaged in a coil housing (5), and the test object (4) surrounding the coil housing (5) at least in part and being movable in its longitudinal direction, characterized in that the test object (4) is constructed as a ring (6) surrounding the coil housing (5) at a distance therefrom, that the measuring coil (1) is provided with at least two voltage taps (7), so that individual voltages can be tapped, one after the other, between the adjacent voltage taps (7), and that the electronic supply/evaluation circuit (3) comprises an electronic component (9) for amplifying the summation of the tapped individual voltages to produce an increased voltage value, and a further electronic component (10) for processing the increased voltage value to produce a total voltage which is correlated with the position of the test object (4).

3. Distance measuring system as in claim 1 or 2, characterized in that the voltage taps (7) or the coil sections extending between the voltage taps (7) are selected, so that individual voltages are at least largely identical in the absence of the ring (6).

4. Distance measuring system as in claim 1 or 2, characterized in that between the individual voltage taps (7) and a common measuring tap (11) resistors (12) are interposed, which are coupled to one another on the side facing away from the respective voltage tap (7) in direction toward the measuring tap (11).

5. Distance measuring system as in claim 4, characterized in that the resistors (12) have an at least largely identical rated value.

6. Distance measuring system as in claim 4, characterized in that the resistors (12) have a rated or resistance value, which is by about two orders higher than the output resistance of the measuring coil (1).

7. Distance measuring system as in claim 4, characterized in that the resistors (12) are arranged together with the measuring coil (1) and the voltage taps inside the coil housing (5).

8. Distance measuring system as in claim 1 or 2, characterized in that the ring (6) has a width corresponding to at most the spacing between two neighboring voltage taps (7).

9. Distance measuring system as in claim 1 or 2, characterized in that the ring (6) has a width corresponding exactly to the spacing between two neighboring voltage taps (7), so that the total output resistance of measuring coil (1) cannot be changed regardless of the position of ring (6).

10. Distance measuring system as in claim 1 or 2, characterized in that said supply/evaluation circuit includes a bridge circuit which includes two resistors (13, 14), and the measuring coil (1) is connected via said two resistors.

11. Distance measuring system as in claim 1 or 2, characterized in the measuring coil (1) is connected in addition to a source of dc voltage (16).

12. Distance measuring system as in claim 1 or 2, characterized in that the ring (6) is provided with a compensation coil which is arranged in its interior and can be biased by the alternating current supplied by said alternating current supplying means.

13. Distance measuring system as in claim 1 or 2, characterized in that the sensor (2) operates by inductance.

14. Distance measuring system as in claim 1 or 2, characterized in that the sensor (2) operates by the eddy-current principle.

15. Distance measuring system as in claim 1 or 2, characterized in that the measuring coil (1) possesses a ferromagnetic core.

16. Distance measuring system as in claim 1 or 2, characterized in that the ring (6) is made of a material having a low electrical resistivity.

17. Distance measuring system as in claim 16, characterized in that the ring (6) is made of aluminum.

18. A method of noncontact distance measuring utilizing a distance measuring system as defined in claim 1, and comprising the steps of tapping the voltage values, one after the other and in accordance with the number of voltage taps (7), each between the individual voltage tap (7) and a reference potential, and processing a summation of the tapped voltage values to produce a total voltage which is correlated with the position of the test object (4).

* * * * *